INVENTOR.
Thomas A. Barrentine,
BY Victor J. Evans Leo
ATTORNEYS

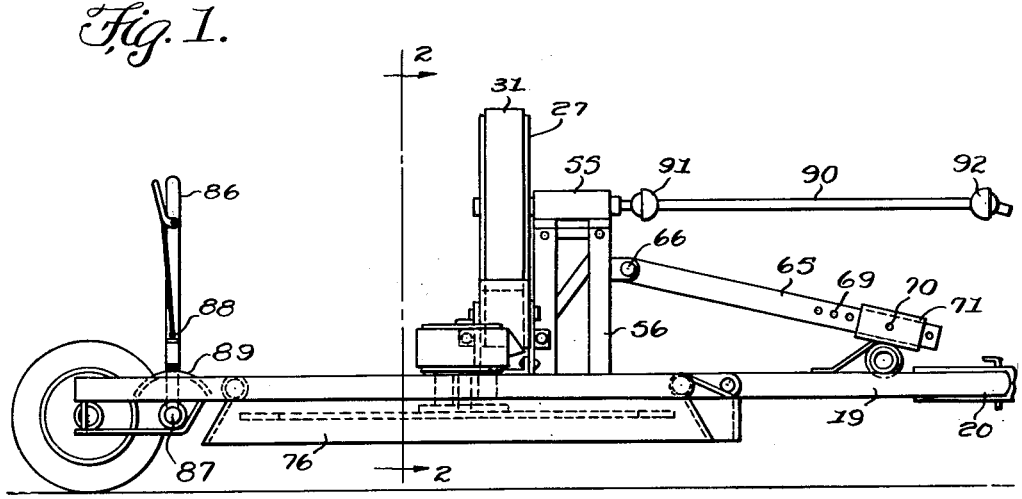
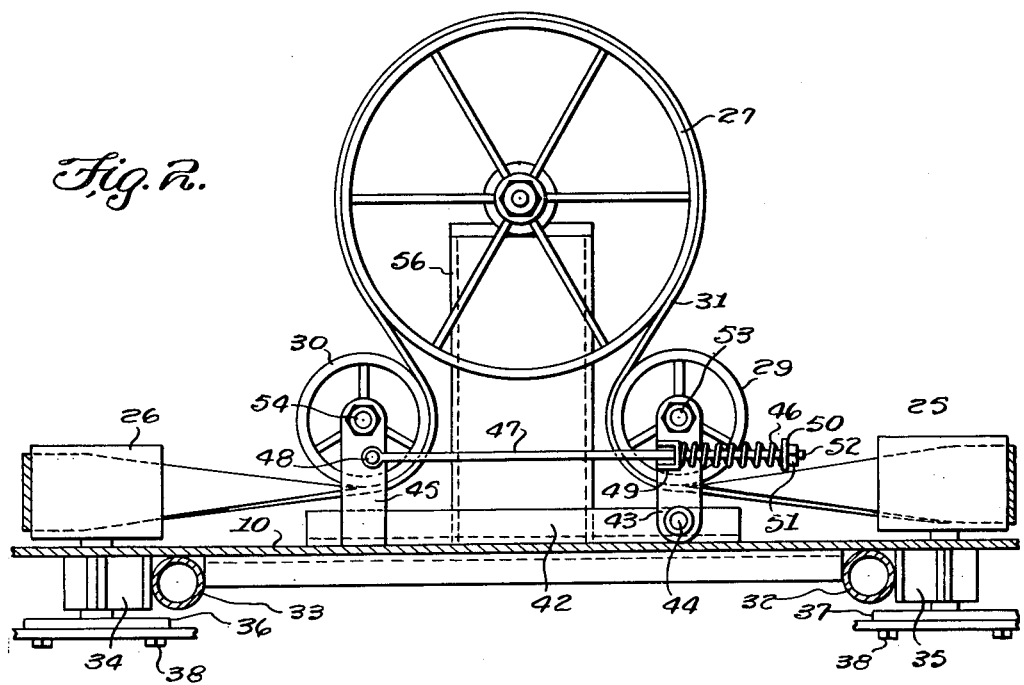

United States Patent Office 2,706,879
Patented Apr. 26, 1955

2,706,879

ROTARY STALK CUTTING MACHINE

Thomas Adelbert Barrentine, Greenwood, Miss.

Application January 2, 1953, Serial No. 329,211

1 Claim. (Cl. 55—62)

This invention relates to mowing machines of the type using cutters rotating in a horizontal plane and mounted on a tractor drawn frame, and in particular a flat substantially rectangular shaped frame having ground engaging wheels adjustably mounted on one side and a tongue extended from the opposite side and having spaced vertically disposed shafts with cutter bars carried on the lower ends and with the shafts rotated with a power take-off of a tractor to which the tongue of the frame is connected.

The purpose of this invention is to provide means for mounting a plurality of rotary cutters on a frame whereby the cutters are actuated with a common endless belt and wherein the belt is adapted to be driven by the power take-off of a towing vehicle.

Various types of horizontally rotatable cutters have been used on mowing machines and other devices have been used for operating parts of machines from the power take-off of a tractor, however, for use in cutting corn stalks and other trash in a field where the dust wears gears and other operating parts, it has been found desirable to provide means for driving the cutting elements with an endless belt that is adapted to be driven directly from the power take-off of a tractor. With this thought in mind this invention contemplates a horizontally disposed frame having rotary cutters journaled therein in which the cutters are actuated by a comparatively large driving pulley with an endless belt trained over the pulley and extended around take-up idlers and also pulleys on the cutting elements.

The object of this invention is, therefore, to provide an arrangement of pulleys wherein spaced vertically disposed cutter carrying shafts may be driven with a horizontally disposed shaft through an endless belt and wherein tension is maintained in the belt continuously.

Another object of the invention is to provide a stubble cutting machine having cutters rotating in horizontal planes and driven through an endless belt from a power take-off of a tractor in which means is provided for adjusting the elevation of the cutters and also the elevation of connecting means of the device to a tractor.

A further object of the invention is to provide a stubble cutting device having cutters rotating in horizontal planes and driven from the power take-off of a tractor through an endless belt in which the device is of a simple and economical construction.

With these and other objects and advantages in view the invention embodies a horizontally disposed rectangular shaped frame having a tongue adjustably mounted on one side, ground engaging wheels adjustably mounted on and extended from the opposite side, spaced vertically disposed shafts having cutter bars on the lower ends journaled in the frame, a driving pulley mounted on a horizontally disposed shaft journaled on the frame, and a belt trained over the pulley, around pulleys on the shafts and over take-up idler pulleys for driving the cutter carrying shafts by the power take-off of a tractor.

Other features and advantages of the invention will appear from the following description taken in connection with the drawings, wherein:

Figure 1 is a side elevational view illustrating the improved rotary cutter attachment.

Figure 2 is a section taken on line 2—2 of Fig. 1 with parts broken away and showing the parts on an enlarged scale.

Figure 3:
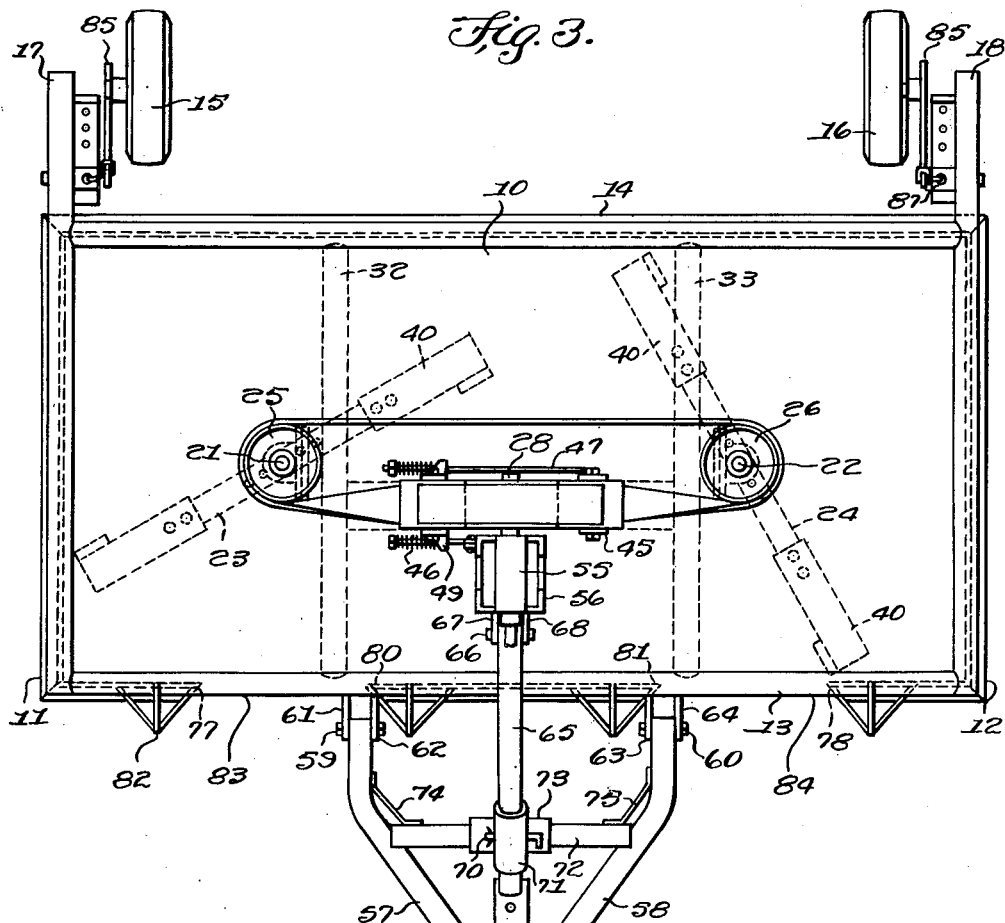
Figure 3 is a plan view showing the general arrangement of the attachment.

Referring now to the drawings wherein like reference characters denote corresponding parts the improved corn stalk and other stubble cutter of this invention includes a horizontally disposed base plate 10 mounted on a rectangular shaped frame or platform having tubular end beams 11 and 12 connected with a tubular front beam 13 and a similar rear beam 14. The frame is provided with ground engaging wheels 15 and 16 which are adjustably mounted on brackets 17 and 18, respectively, a tongue 19 pivotally mounted on the front beam 13 and having a hinge 20 on the extended end, vertically disposed shafts 21 and 22 journaled therein and having cutter bars 23 and 24, respectively carried by the lower ends and pulleys 25 and 26 mounted on the upper ends, a driving pulley 27 mounted on a horizontally disposed shaft 28, idler pulleys 29 and 30 also journaled therein and a belt 31.

Figure 4:
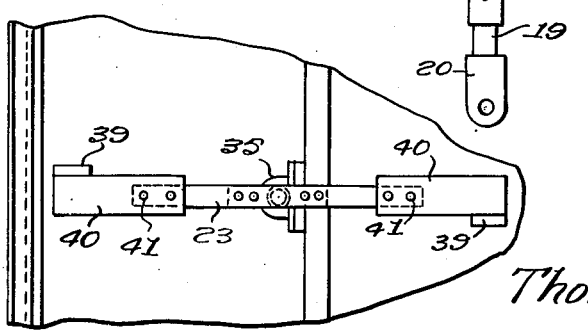
Figure 4 is a detail looking upwardly toward the under side of one of the cutter bars illustrating the mounting of the cutting blade on the bars.

The frame is provided with intermediate beams 32 and 33 on which bearings 34 and 35, respectively in which the shafts 21 and 22 are journaled, are mounted, and the lower ends of the shafts 21 and 22 are provided with brackets 36 and 37 to which the cutter bars 23 and 24 are secured with bolts 38 and, as illustrated in Fig. 4 cutting blades 39 carried by plates 40 are secured to the ends of the cutter bars 23 and 24 with bolts 41.

As illustrated in Fig. 2 the pulleys 25 and 26 are positioned above the base plate 10 and the idler pulleys 29 and 30 are mounted on the beam 42 positioned on the base plate. The idler 29 is mounted in a bracket 43 that is secured to the beam 42 with a bolt 44, and the idler 30 is mounted in the bracket 45 that is urged toward the bracket 43 with springs 46 on rods 47 one of the ends of which are connected to the bracket 45 with bolts 48 and the other of the ends of which extend through clips 49 on the bracket 43, the ends of the springs 46 bearing against the clips 49 and also against washers 50 that are held by nuts 51 on the threaded ends 52 of the rods 47.

The idler pulley 29 is journaled in the bracket 43 with a stud 53 and the idler 30 is journaled in the bracket 45 with a similar stud 54. The driving pulley 27 which is mounted on the shaft 28 is journaled on the frame through a bearing 55 on the upper end of a bearing stand 56 which is mounted on the frame. With the idler pulley positioned, particularly as illustrated in Fig. 2 continuous tension is maintained on the belt whereby the vertically disposed shafts of the cutter bars are driven continuously however, should a cutter strike a rock or other fixed obstruction slippage between the belt and pulley is possible thereby preventing breaking of the cutter bar.

The tongue 19 is formed with V-shaped outwardly extended bars 57 and 58 and the ends of the bars are pivotally connected to the front beam 13 with bolts 59 and 60, respectively, the bolt 59 extending through ears 61 and 62 and the bolt 60 extends through similar ears 63 and 64.

The tongue 19 is retained in adjusted positions with an arm 65, pivotally mounted on the bearing stand 56 with a bolt 66, which extends through ears 67 and 68 on the bearing stand. The extended end of the arm 65 is provided with spaced openings 69 through which a bolt 70 in a sleeve 71 extends and, as illustrated in Figs. 1 and 3 the sleeve 71 is mounted on a cross bar 72 with a similar sleeve 73.

The ends of the cross bar are secured to the bars 57 and 58 of the tongue with braces 74 and 75.

The frame of the machine is provided with a depending flange or skirt 76 which extends from a point 77 on the front beam 13 around the ends and across the back to a corresponding point 78 at the opposite side of the frame, and a similar flange or skirt 79 extends from the point 80 to the point 81.

The front bar 13 is provided with V-shaped guides 82 which extend forwardly from the ends of the flange or skirt providing stalk or stubble receiving gaps 83 and 84 at the front of the frame and at the sides of the tongue.

The ground engaging wheels 15 and 16 are journaled on the ends of arms 85 which extend from hand levers 86 that are pivotally mounted in the brackets 17 and 18 with pins 87 and with the hand lever 86 provided with conventional latches 88 that coact with gear segments 89 the elevation of the ground engaging wheels is readily adjustable.

With the parts arranged in this manner the tongue 19 may be attached with the hitch 20 to the draw bar of a tractor and the power take-off of the tractor connected to the shaft 28 on which the driving pulley 27 is mounted with a connecting shaft 90 the ends of which are provided with universal joints 91 and 92.

By this means the driving pulley 27 is rotated by the power take-off of the tractor and the belt 31 through the idler pulleys 29 and 30 and the pulleys 25 and 26 rotates the cutter bar carrying shafts 21 and 22 whereby the cutters are rotated in horizontal planes.

It will be understood that modifications, within the scope of the appended claim, may be made in the design and arrangement of the parts without departing from the spirit of the invention.

What is claimed is:

In a rotary stalk cutter, a horizontally disposed base plate, brackets extending rearwardly from said base plate, hand levers pivotally connected to said brackets, coacting latches and gear segments for maintaining said levers immobile in their adjusted positions, arms extending from the lower ends of said levers, wheels journaled on the ends of said arms, a pair of vertically disposed spaced parallel shafts journaled on said base plate, power means for rotating said shafts, cutter bars mounted on the lower ends of said shafts and positioned below said base plate, a beam extending across the front of said base plate, a tongue arranged forwardly of said base plate, said tongue including a pair of bars having their front portions arranged angularly in a V-shape and the rear ends of said bars being arranged in spaced parallel relation with respect to each other and pivotally connected to said beam, a bearing stand extending upwardly from said base plate, an arm pivotally connected to said bearing stand and having a first sleeve adjustably mounted on its front end, a second sleeve extending transversely below said first sleeve and secured thereto, a cross bar extending through said second sleeve and secured to the inclined front portions of the bars of said tongue, an outwardly extending skirt depending from said base plate, said skirt extending from a point at the front of said base plate around the sides and back of said base plate to a second point on the front of the base plate, a flange depending from the front of said base plate and spaced from said skirt to define openings therebetween, the lower edges of said skirt and flange being spaced below said cutter bars, and V-shaped guides extending forwardly from said flange and skirt.

References Cited in the file of this patent

UNITED STATES PATENTS

| | | |
|---|---|---|
| 2,229,363 | Bishop | Jan. 21, 1941 |
| 2,578,963 | Bell | Dec. 18, 1951 |
| 2,592,991 | Yeager et al. | Apr. 15, 1952 |
| 2,621,460 | Haapala | Dec. 16, 1952 |
| 2,633,687 | Bannister | Apr. 7, 1953 |